United States Patent [19]
Sakaki et al.

[11] 4,145,747
[45] Mar. 20, 1979

[54] METHOD FOR ESTABLISHING A TAP COEFFICIENT OF AN ADAPTIVE AUTOMATIC EQUALIZER

[75] Inventors: Hiroshi Sakaki; Sotokichi Shintani, both of Tokyo, Japan

[73] Assignee: Kokusai Denshin Denwa Kabushiki Kaisha, Tokyo, Japan

[21] Appl. No.: 833,700

[22] Filed: Sep. 15, 1977

Related U.S. Application Data

[63] Continuation-in-part of Ser. No. 670,631, Mar. 25, 1976, abandoned.

[30] Foreign Application Priority Data

Mar. 25, 1976 [JP] Japan .................. 50-34906

[51] Int. Cl.² .................. G06F 15/34; H04B 3/04
[52] U.S. Cl. .................. 364/724; 325/42; 333/18; 364/574; 364/728
[58] Field of Search .................. 325/42; 333/18, 28; 364/514, 574, 728, 724

[56] References Cited

U.S. PATENT DOCUMENTS

| 3,609,597 | 9/1971 | Moye | 333/18 |
| 3,624,562 | 11/1971 | Fujimura | 333/18 |
| 3,715,665 | 2/1973 | Chang | 333/18 |
| 3,715,666 | 2/1973 | Mueller et al. | 325/42 |
| 3,715,670 | 2/1973 | Hirsch et al. | 325/42 |
| 3,820,042 | 6/1974 | Mueller | 325/42 |
| 3,921,072 | 11/1975 | Sato | 325/42 |
| 4,006,352 | 2/1977 | Sato | 333/18 |
| 4,021,738 | 5/1977 | Gitlin et al. | 325/42 |
| 4,064,397 | 12/1977 | Sakaki et al. | 364/724 |

Primary Examiner—Felix D. Gruber
Attorney, Agent, or Firm—Armstrong, Nikaido, Marmelstein & Kubovcik

[57] ABSTRACT

A method and apparatus is provided for adjusting the tap coefficient of an adaptive automatic equalizer having a plurality of tap registers. An input signal is repetitively applied to a train of tapped delay elements and the sum of the weighted output of each tap output is obtained. An error output is obtained by taking the difference between the sum of the weighted output of each tap output and a reference signal, and a correlation value is obtained between the error output and each tap output of the delay elements. The improvement comprises storing the tap weights of each of the tapped registers and obtaining the total sum of each tap weight of one of the registers wherein the tap weight of a tap is the correlation value. This step is repeated M times, where M is an integer so that the total sum of each tap weight in another of the tapped registers is obtained and the error output is added to the total sum, determining a value of tap coefficient by the final total sum after M adjustments of the most rapid equalization. The optimum coefficient is obtained by using the value of the tap coefficient for the most rapid equalization of the tapped registers and the weight of the taps of the delay element is revised by the optimum coefficient-weight-sum of the contents of the tapped register and the tapped delay elements, thereby adjusting the weight of each tap of the delay elements.

4 Claims, 9 Drawing Figures

METHOD FOR ESTABLISHING A TAP COEFFICIENT OF AN ADAPTIVE AUTOMATIC EQUALIZER

COPENDING APPLICATION

The present application is a continuation-in-part application of U.S. Ser. No. 670,631 which is now abandoned.

BACKGROUND OF THE INVENTION

The present invention relates to an adaptive automatic equalizer and, in particular, relates to a method for rapid tap coefficient adjustment in the same.

In a prior automatic equalizer, for instance, described in ("A New Equalizer Structure for Fast Start-up Digital Communication" by R.W. Chang, B.S.T.J. vol 50, No. 6, July-August, 1971), a tap gain control coefficient (which will be called "a tap coefficient" hereinafter) is a predetermined value, and the tap adjustment is performed using said coefficient. In the prior art, a tap coefficient is calculated for every operational cycle of the equalizer. Accordingly, the prior equalizer has the disadvantage that convergence of the value of the tap coefficient is very slow.

SUMMARY OF THE INVENTION

It is an object, therefore, of the present invention to overcome the disadvantage and/or the limitation of the prior automatic equalizer by providing a new and improved adaptive automatic equalizer which can provide rapid convergence of a tap gain control coefficient.

It is also an object of the present invention to provide an adaptive automatic equalizer which performs a plurality of tap adjustments in a single operational cycle and, thus, provides rapid convergence of a tap gain control coefficient.

The above and other objects are attained by a method for establishing the tap coefficient of an adaptive automatic equalizer comprising the steps of: applying an input signal repetitively to a train of tapped delay elements; obtaining the error output between the difference of the weighted output of each tap output and the reference signal; obtaining the correlation power or value between said error output and each tap output of said delay elements, and; adjusting the weight of each tap of said delay elements using the product of the tap coefficient $\alpha$ and said correlation value; the improvement of further steps comprising: obtaining the total sum of each tap weight of a tapped register wherein the weight of a tap is said correlation value; selectively repeating the previous step in another tapped register; replacing said error output by said total sum; determining the value of said tap coefficient $\alpha$ by the final total sum for the most rapid equalization; obtaining the best adding-coefficient using said value $\alpha$ for the most rapid equalization of said tapped register, and; revising the weight of the tap of said delay elements by the adding-coefficient-weight-sum of the contents of said tapped register and said tapped delay elements.

BRIEF DESCRIPTION OF THE DRAWINGS

The foregoing and other objects, features and attendant advantages of the invention will be appreciated as the same become better understood by means of the following description and the accompanying drawings wherein.

DESCRIPTION OF THE PREFERRED EMBODIMENTS

Figure 1:
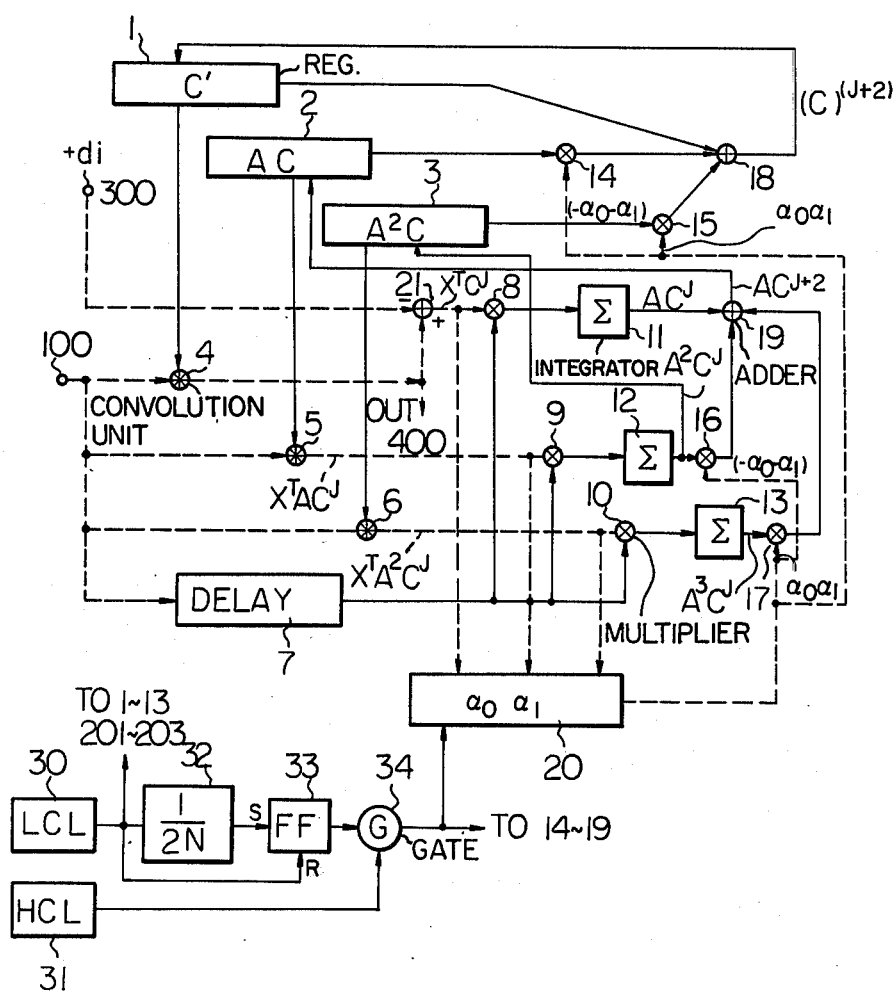
FIG. 1 is a block-diagram of the automatic equalizer for M=2 according to the present invention.

First, the basic theory of an automatic equalizer will be described so that the present invention may be more easily understood.

The change of the kth tap value of a transversal equalizer having N taps $C_i (i=1, \ldots, N)$ is defined by the equation (1).

$$C_k^{J+1} = C_k^J - \alpha_J \tfrac{1}{2} (\partial \epsilon_N / \partial C_k) \qquad (1)$$

where $$\tfrac{1}{2} (\partial \epsilon_N / \partial C_k) = \sum_{P=-\infty}^{\infty} e_P x_{P-k} = \qquad (2)$$

$$[\ldots x_{P-k}, x_{(P+1)-k} \ldots ] \begin{bmatrix} \vdots \\ e_P \\ e_{P+1} \\ \vdots \end{bmatrix}$$

$e_P$ is the error output at the time P, $x_{P-k}$ is the output of the kth tap. The character J in the equation (1) indicates the value relating to the Jth trial of a tap change. From the equations (1) and (2), the following equation is satisfied for all N taps.

$$\begin{bmatrix} C_1^{J+1} \\ \vdots \\ C_k^{J+1} \\ \vdots \\ C_N^{J+1} \end{bmatrix} = \begin{bmatrix} C_1^J \\ \vdots \\ C_k^J \\ \vdots \\ C_N^J \end{bmatrix} - \qquad (3)$$

$$\alpha_J \begin{bmatrix} \cdots x_{(P)}, x_{(P+1)} \cdots \\ \cdots x_{(P)-1}, x_{(P+1)-1} \cdots \\ \cdots x_{(P)-k}, x_{(P+1)-k} \cdots \\ \vdots \\ \cdots x_{(P)-(N-1)}, x_{(P+1)-(N-1)} \cdots \end{bmatrix} \begin{bmatrix} \vdots \\ e_P \\ e_{P+1} \\ \vdots \end{bmatrix}$$

Concerning the error output, the following equation is satisfied by calculating the convolution between the input signal and the tap error (tap gain error of an equalizer).

$$\begin{bmatrix} \vdots \\ e_P \\ e_{P+1} \\ \vdots \end{bmatrix} = \begin{bmatrix} & & & & \\ x_{(P)} & x_{(P)-1} & \vdots & x_{(P)-k} & \vdots x_{(P)-(N-1)} \\ x_{(P)+1} & x_{(P+1)-1} & \vdots x_{(P+1)-k} & \vdots x_{(P+1)-(N-1)} \\ & & & & \end{bmatrix} \begin{bmatrix} C_1^J \\ \vdots \\ C_k^J \\ \vdots \\ C_N^J \end{bmatrix} \quad (4)$$

From the equation (3) and (4), the following equation is derived.

$$\begin{bmatrix} C_1^{J+1} \\ \vdots \\ C_k^{J+1} \\ \vdots \\ C_N^{J+1} \end{bmatrix} = \begin{bmatrix} C_1^J \\ \vdots \\ C_k^J \\ \vdots \\ C_N^J \end{bmatrix} - \alpha_J \begin{bmatrix} \cdots x_{(P)}, x_{(P+1)} \cdots \\ \cdots x_{(P)-1}, x_{(P+1)-1} \cdots \\ \cdots x_{(P)-k}, x_{(P+1)-k} \cdots \\ \vdots \\ \cdots x_{(P)-(N-1)}, x_{(P+1)-(N-1)} \cdots \end{bmatrix} \begin{bmatrix} x_{(P)} & x_{(P)-1} & \vdots x_{(P)-k} & \vdots x_{(P)-(N-1)} \\ x_{(P)+1} & x_{(P+1)-1} & \vdots x_{(P+1)-k} & \vdots x_{(P+1)-(N-1)} \end{bmatrix} \begin{bmatrix} C_1^J \\ \vdots \\ C_k^J \\ \vdots \\ C_N^J \end{bmatrix} \quad (5)$$

When the substitution shown in the equations (6), (7) and (8), below, is performed for each term of the equation (5), the equation (9) is derived.

$$[C_1^J \ldots C_k^J \ldots C_N^J]^T = C^J \quad (6)$$

$$\begin{bmatrix} \cdots x_{(P)}, x_{(P+1)} \cdots \\ \cdots x_{(P)-1}, x_{(P+1)-1} \cdots \\ \cdots x_{(P)-k}, x_{(P+1)-k} \cdots \\ \vdots \\ \cdots x_{(P)-(N-1)}, x_{(P+1)-(N-1)} \cdots \end{bmatrix} = X \quad (7)$$

$$XX^T = A \quad (8)$$

$$C^{J+1} = C^J - \alpha_J XX^T C^J = \quad (9)$$
$$(I - \alpha_J XX^T) C^J = (I - \alpha_J A) C^J$$

where I is a unit matrix and T on the shoulder of X shows the transposed matrix of X. From the equation (9), the equation (10) is derived.

$$C^{J+M} = \prod_{m=0}^{M-1} (I - \alpha_m A) C^J \quad (10)$$

The value of the tap error after the Mth tap adjustment is shown in the equation (10). The error time function $e^{J+M}$ at this time is the convolution of $C^{J+M}$ and the input signal, and is obtained by multiplying $X^T$ by the right hand portion of the equation (10), that is:

$$e_P^{J+M} = X^T \prod_{m=0}^{M-1} (I - \alpha_m A) C^J \quad (11)$$

The equation (11) shows the value of voltage. The power integral value $E^{J+M}$ is the inner product of the equation (11) and is expressed as follows.

$$E^{J+M} = e_P^{J+M^T} e_P^{J+M} = \quad (12)$$
$$C^{J^T} \prod_{m=0}^{M-1} (I - \alpha_m A) XX^T \prod_{m=0}^{M-1} (I - \alpha_m A) C^J$$

The basic theory of a prior automatic equalizer, in particular, the adjustment of a tap and the error value thereof, should be clear from the above explanation.

The present invention pursues rapid astringency in an equalizer for M times the tap adjustment. The value of $\alpha_m$ (in the equation (11), for instance) depends upon the value of M, (so the case where M=2 is described in detail.) Naturally, a similar discussion is possible in the case of M=1, M=3 or others.

The feature of the invention resides in the expansion of each of the terms of the equation (10), which concerns a prior equalizer. In the case of M=2, the result of the expansion is:

$$C^{J+2} = (I - \alpha_0 A)(I - \alpha_1 A)C^J = C^J - (\alpha_0 + \alpha_1)AC^J + \alpha_0\alpha_1 A^2 C^J \tag{13}$$

The value of the error at this time derived from the equation (12), is:

$$\begin{aligned} E^{J+M} &= (C^J)^T(I - \alpha_0 A^T)(I - \alpha_1 A^T)XX^T(I - \alpha_0 A)(I - \alpha_1 A)C^J \\ &= (C^J)^T(I - (\alpha_0 + \alpha_1)A^T + \alpha_0\alpha_1(A^T)^2)XX^T \\ & \quad (I - \alpha_0 + \alpha_1)A + \alpha_0\alpha_1 A^2)C^J \\ &= (C^J)^T IXX^T IC^J - (\alpha_0 + \alpha_1)(C^J)^T IXX^T AC^J + \alpha_0\alpha_1 \cdot (C^J)^T IXX^T(A^T)^2 C^J \\ & \quad - (\alpha_0 + \alpha_1)(C^J)^T A^T XX^T IC^J + (\alpha_0 + \alpha_1)^2 (C^J)^T A^T XX^T AC^J \\ & \quad - \alpha_0\alpha_1(\alpha_0 + \alpha_1)(C^J)^T AXX^T A^2 C^J + \alpha_0\alpha_1(C^J)^T (A^T)^2 XX^T IC^J \\ & \quad - \alpha_0\alpha_1(\alpha_0 + \alpha_1)(C^J)^T (A^T)^2 XX^T AC^J + (\alpha_0\alpha_1)^2(C^J)^T (A^T)^2 XXA^2 C^J \end{aligned} \tag{14}$$

Since A is a Toeplitz matrix, the equation (15) below is satisfied.

$$A^T = A \tag{15}$$

In view of the equation (8), the equation (16) below is satisfied.

$$C^{JT} A^m XX^T A^n C^J = C^{JT} A^{m'} XX^T A^{n'} C^J \quad (m+n = m'+n') \tag{16}$$

The following equation (17) is derived from the equations (14) and (16).

$$\begin{aligned} E^{J+M} &= (C^J)^T IXX^T IC^J - 2(\alpha_0 + \alpha_1)(C^J)^T IXX^T AC^J \\ & \quad + [2\alpha_0\alpha_1 + (\alpha_0 + \alpha_1)^2](C^J)^T IXX^T A^2 C^J \\ & \quad - 2\alpha_0\alpha_1(\alpha_0 + \alpha_1)(C^J)^T AXX^T A^2 C^J \\ & \quad + (\alpha_0\alpha_1)^2 (C^J)^T A^2 XX^T A^2 C^J \end{aligned} \tag{17}$$

Now, the electrical considerations of each of the terms of the equations (13) and (17) will be explained.

$C^J$ in the equation (13) is the vector of the tap error $C_k(k=1\ldots N)$ before a pair of tap adjustments. $X^T C^J$, of $AC^J = XX^T C^J$, is the convolution between the input $x_p$ and the tap error $C_k^J$, and so $X^T C^J$ is the time function of the error output at the tap error $C^J$. Therefore, $XX^T C^J$ which is the product of X and $X^T C^J$ from the left, is the correlation power of the output $x_{p-k}$ of each tap and each element of $X^T C^J$, and is obtained for each tap. Thus, $XX^T C^J$ is obtained from the $C^J$. We call the above operation "the multiplication of A and a tap". This operation can be performed in sequence, and $A^2 C^J$ is obtained by applying said operation to the tap error $AC^J$. That is to say, $X^T AC^J$ is the convolution between the input $x_p$ and the tap error $AC^J$, and the result is the time function of the error at the tap error $AC^J$. $XX^T AC^J$ is the product of each tap output $x_{p-k}$ and each element of $X^T AC^J$, and is also obtained for every tap. Thus, $A^m C^J$ is obtained in sequence.

Next, the equation (14) is explained. The typical term $(C^J)^T A^m XX^T A^n C^J$ in the equation (14) is the inner product of a pair of the column vectors, $X^T A^m C^J$ and $X^T A^n C^J$, which are obtained as the time function of the tap error of $A^m C^J$ and $A^n C^J$, respectively. By obtaining $A^m C^J$, etc., with the above operation, all terms in the equation (14) (and all terms of the equation (17)) are obtained.

Next, the equation (17) can be considered as the function of $\alpha_0, \alpha_1$. The equation (17) can be changed to the equation (19) by the substitution of the equation (18).

$$\begin{aligned} (C^J)^T IXX^T IC^J &= a \\ (C^J)^T IXX^T AC^J &= b \\ (C^J)^T IXX^T A^2 C^J &= c \\ (C^J)^T AXX^T A^2 C^J &= d \\ (C^J)^T A^2 XX^T A^2 C^J &= e \end{aligned} \tag{18}$$

$$E^{J+2}(\alpha_0, \alpha_1) = a - 2(\alpha_0 + \alpha_1)b + [2\alpha_0\alpha_1 + (\alpha_0 + \alpha_1)^2]c - 2\alpha_0\alpha_1(\alpha_0 + \alpha_1)d + (\alpha_1)^2 e \tag{19}$$

The condition value $\alpha_0$ and $\alpha_1$ for minimizing the left term of the equation (17) is obtained by solving the simultaneous equations (20), and the result is shown in (21).

$$\left. \begin{aligned} \frac{\partial E^{J+2}(\alpha_0, \alpha_1)}{\partial \alpha_0} &= 0 \\ \frac{\partial E^{J+2}(\alpha_0, \alpha_1)}{\partial \alpha_1} &= 0 \end{aligned} \right\} \tag{20}$$

$$\alpha_0 \text{ or } \alpha_1 = \frac{1}{2}\left[ \left(\frac{be - cd}{ce - d^2}\right) \pm \sqrt{\left(\frac{be - cd}{ce - d^2}\right)^2 - 4\left(\frac{db - c^2}{cd - d^2}\right)} \right] \tag{21}$$

The value $\alpha_0, \alpha_1$ obtained by the equation (21) is the tap coefficient for the most rapid astringency for each pair of equalizer operations.

According to the present invention, a pair of multiplication operations for multiplying each tap by A are performed instead of a pair of tap adjustments as in the prior art. The advantage of the present procedure is that the optimum tap is always established by the steps of obtaining a tap gain by multiplying an original tap by A, obtaining the optimum tap coefficient through the equation (21), and obtaining the revised tap coefficient through the equation (13). It should be noted that the prior art utilized a predetermined tap coefficient so that the equalization is not always the best. Since the process of the prior tap establishment is the same as that of the present multiplication of a tap by A, the present invention can provide an improved equalization with the same process and trouble as the prior equalizer except for the calculation of the equation (21). The explanation of the theory in the case of M=2 is now completed.

Next, the theory in the case of M=1 is briefly explained. In this case, the equations corresponding to the equations (13) and (12) are the equations (22) and (23), respectively.

$$C^{J+1} = (I - \alpha_0 A) C^J = C^J - \alpha_0 AC^J \tag{22}$$

$$\begin{aligned} E^{J+1} &= (C^J)^T(I - \alpha_0 A^T)XX^T(I - \alpha_0 A)C^J \\ &= (C^J)^T IXX^T IC^J - 2\alpha_0(C^J)^T AXX^T IC^J \\ & \quad + \alpha_0^2(C^J)^T AXX^T AC^J \end{aligned} \tag{23}$$

The equation (23) can be changed to the equation (25) by the substitution of the equation (24).

$$\begin{aligned} (C^J)^T IXX^T IC^J &= a \\ (C^J)^T IXX^T AC^J &= b \\ (C^J)^T AXX^T AC^J &= c \end{aligned} \right\} \tag{24}$$

$$E^{J+1}(\alpha_0) = a - 2\alpha_0 b + \alpha_0^2 c \quad (25)$$

Next, by solving the equation (26), the solution (27) is obtained.

$$\frac{\partial E^{J+1}(\alpha_0)}{\partial \alpha_0} = 0 \quad (26)$$

$$\alpha_0 = \frac{b}{c} \quad (27)$$

The equation (27) shows the tap coefficient which gives the best astringency in case of M=1.

Figure 2:
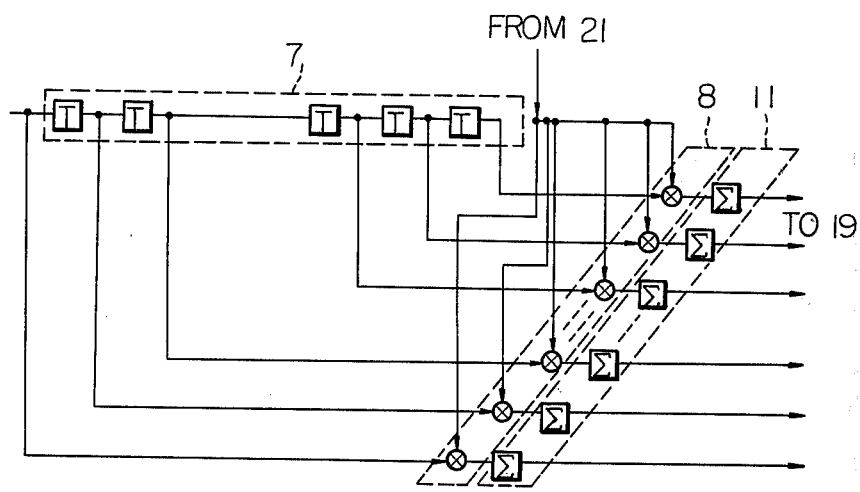
FIG. 2 is a block-diagram of the delay elements 7, the multiplier 8 and the integrator 11 in FIG. 1.
Figure 3:
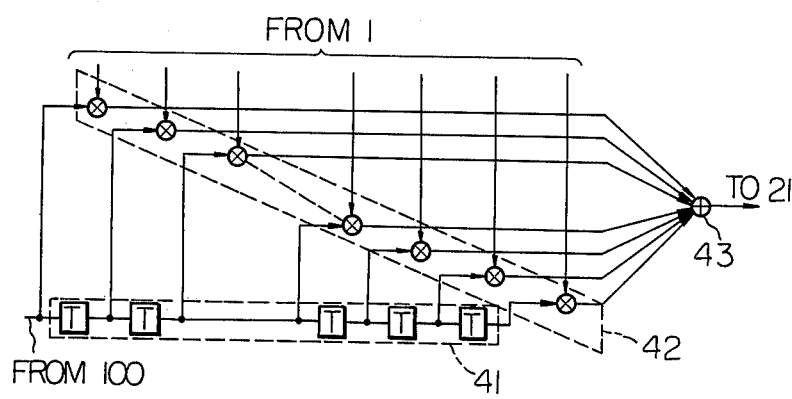
FIG. 3 is a block-diagram of the convolution unit 4, 5 or 6 in FIG. 1.

Now, the circuit which operates in accordance with the above principle will be explained with reference to FIG. 1, in which the value of M is 2. In FIG. 1, the reference numerals 1, 2 and 3 show registers for storing the time functions C', AC and A²C, respectively. 4, 5 and 6 are convolution units, which calculate the convolution between the input signal and the transfer function in each register. 7 is a train of delay elements, and have N taps one at every delay interval T, which is equal to the pulse interval of the input signal. 8, 9 and 10 are integrated multipliers, and 11, 12 and 13 are integrated integrators. "Integrated" here means that each multiplier of each integrator has N cell multipliers, or N cell integrators, respectively. The solid lines in FIG. 1 show a signal transfer path which actually has N lines, and the broken lines in FIG. 1 show an information path which has only one or two actual lines. The portions 7, 8 and 11 are shown in detail in FIG. 2, wherein the same reference numeral as in FIG. 1 indicates the same member as in FIG. 1. The convolution unit 4 is shown in detail in FIG. 3, wherein 41 is a train of delay elements whose construction is the same as the member 7 in FIG. 1, 42 is an integrated multiplier for multiplying the outputs of the C' register 1 by the outputs of the delay elements 41, and 43 is an adder for adding a plurality of outputs of the multiplier 42. The integrated multipliers 14, 15, 16 and 17 in FIG. 1 provide the constants of the tap coefficients $\alpha_0$ and $\alpha_1$. 18 and 19 are integrated adders. 20 is a ($\alpha_0$, $\alpha_1$) computer for the calculation of the equation (21). 21 is an adder for adding the correct value $d_i$ applied to the terminal 300 and the output of the equalizer. The value $d_i$ is called a reference signal.

The reference numeral 30 is a low speed clock pulse generator for operating the members 1 through 13 and 201 through 203 in the computer 20 when the burst input signal is applied to the input terminal 100. The frequency of the low speed clock pulse is the same as the sampling frequency at the transmission line. The numeral 31 is a high speed clock pulse generator for operating the members 14 through 20. The frequency of the high speed clock pulse generator 31 is determined according to the operational speed of the digital elements in the circuit. The numeral 32 is a divider which provides an output signal for every 2N input pulses. The flip-flop 33 is set by the output of the divider 32 and is reset by the generator 30, and the output of the flip-flop 33 is applied to the gate circuit 34. Thus, the gate circuit 34 is opened during a single pulse duration of a low speed pulse train for every 2N low speed pulses as shown in FIG. 5(a) and FIG. 5(b).

Now, the operation of the apparatus of FIG. 1 will be explained. It should be appreciated, first, that a pair of tap adjustments are performed in a single operation cycle in the present equalizer.

The C' register 1, the AC register 2 and the A²C register 3 store the tap values relating to the names of each of these registers. The reason that the register 1 is called a C' register is that the value "$X^T(C')^J - d_i$" corresponds to $X^T C^J$ or $X^T I C^J$ in the equations (14) through (18). The present equalizer revises the contents of those registers completely with a pair of input burst signals, and converges the tap gain to the best value. Although the operation of the equalizer is repeated, the origin of time is taken at a time after the C' register 1 and AC register 2 are established and before the A²C register 3 is established for simplicity of the explanation. It is assumed that the input burst signal is applied to the input terminal 100 at the original time. The convolution $X^T AC^J$ between the input burst signal and the transfer function in the AC register is calculated in the convolution unit 5, and is applied to the ($\alpha_0$, $\alpha_1$) computer 20. At the same time, each output of the convolution unit 5 is multiplied by each corresponding output of the delay elements 7 in the multiplier 9 and the product is integrated by the integrator 12. Thus, the value $A^2 C^J$ is obtained. With this value $A^2 C^J$, the content of the A²C register 3 is revised.

The next input burst signal is applied to the terminal 100 and the correct signal $d_i$ is applied to the terminal 300. The input signal from the terminal 100 is applied to the convolution units 4 and 6. The adder 21 provides the difference between the output of the convolution unit 4 and the correct value $d_i$ and, thus, the difference $X^T C^J$ between $X^T(C')^J$ and $d_i$ is obtained. The convolution unit 6 provides the value $X^T A^2 C^J$. The outputs of the adder 21 and the convolution unit 6 are applied to the ($\alpha_0$, $\alpha_1$) computer 20. It should be noted that the computer 20 already has the value $X^T AC^J$ from the output of the convolution unit 5 in the previous cycle. In the computer 20, the values $\alpha_0$ and $\alpha_1$ are calculated by means of the equations (18) and (21). The values $\alpha_0$ and $\alpha_1$ revise the content of the C' register by means of the equation (13). That is to say, the multiplier 14 provides the product of the output of the AC register 2 times ($-\alpha_0 - \alpha_1$), the multiplier 15 provides the product of the A²C register 3 and ($\alpha_0 \cdot \alpha_1$), the adder 18 adds the outputs of the multipliers 14 and 15, and the output C' of the adder 18 revises the content of the C' register to $(C')^{(J+2)}$. In the above operation, the multipliers 8, 9, 10 and the integrators 11, 12, 13 are operating concurrently, and the integrators 11, 12, 13 store the values $AC^J$, $A^2 C^J$, $A^3 C^J$, respectively. The multiplier 16 provides the product $(-\alpha_0 - \alpha_1) \cdot A^2 C^J$ by multiplying the output $A^2 C^J$ of the integrator 12 by the output $(-\alpha_0 - \alpha_1)$ of the computer 20. The multiplier 17 provides the product $(\alpha_0 \alpha_1) \cdot A^3 C^J$ by multiplying the output $A^3 C^J$ of the integrator 13 by the output $(\alpha_0 \alpha_1)$ of the computer 20. The adder 19 provides the sum of the outputs of the integrators 11, 12, and 13 as follows.

$$AC^J + (-\alpha_0 - \alpha_1)A^2 C^J + \alpha_0 \alpha_1 A^3 C^J$$

It should be noted that the above expression is a product of $C^{J+2}$ and A. Thus, the AC register 2 is revised. In the above operation, all registers 1, 2 and 3 are revised, and then the operation of the equalizer returns to the original point.

By repeating the above operation, the registers 1, 2 and 3 are revised in sequence, and convergence of the equalizer is performed.

The members 1 through 13 in FIG. 1 operate in accordance with the low speed clock pulse provided from the low speed clock pulse generator 30. When 2N number of low speed pulses are applied to the circuit, that is to say, when two burst input signals are applied to the input terminal 100, the divider 32 applies the output pulse to the gate circuit 34 to open the same. Thus, the high speed clock pulse is applied to the circuit through the gate circuit 34, and then the computer 20 and the members 14 through 19 operate in accordance with the high speed clock pulses. Since the flip-flop 33 is reset to zero by the next low speed clock pulse, the high speed clock pulse appears only during a single clock duration of a low speed clock pulse.

Figure 4:
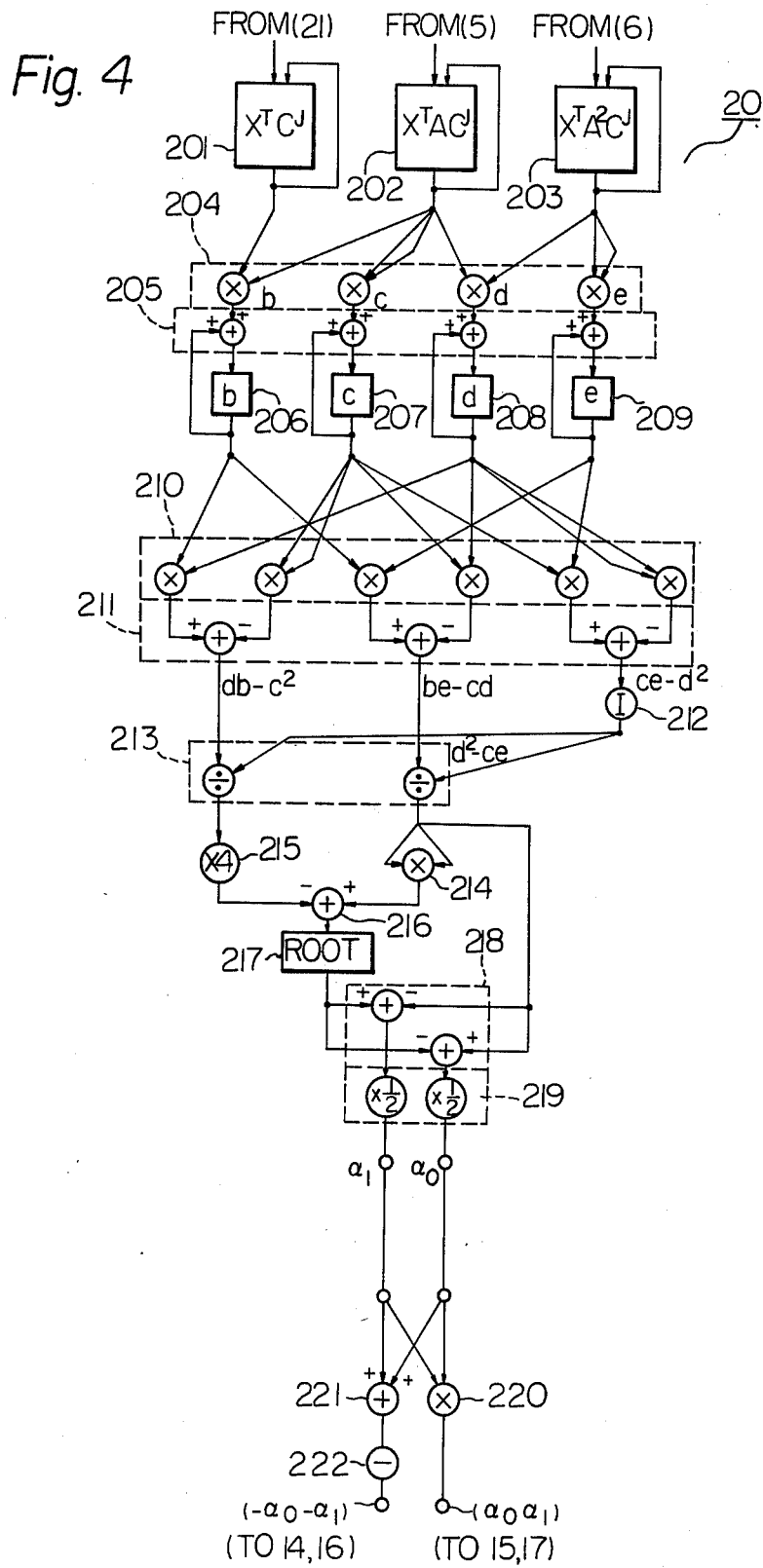
FIG. 4 is a detailed block-diagram of the computer 20 in FIG. 1.

FIG. 4 shows the detailed block-diagram of the computer 20, which computes the values $\alpha_0$ and $\alpha_1$ according to the formula 21. The registers 201, 202 and 203 receive the value of $X^T C^J$, $X^T A C^J$, and $X^T A^2 C^J$ respectively, from the members 21, 5 and 6, respectively. As those values are the time function the length of which is N, said registers 201, 202 and 203 can be composed of shift registers having the N number of unit registers. The reference numeral 204 is a multiplier which performs the multiplication according to the arrows in FIG. 4. The adder 205 and the registers 206, 207, 208 and 209 compose an integrator. The registers 206, 207, 208 and 209 provide the value b, c, d and e in the formula 18. As the calculation of the formula 18 is the inner product of a pair of vectors, the integrator having an adder and a register is utilized for the calculation of said inner product. Using the values (b, c, d and e) thus obtained, the group of multipliers 210 and the group of adders 211 and an inverter 212 provide the values $db - c^2$, $be - cd$, and $d^2 - ce$. A pair of dividers 213, a multiplier 214, a times 4-multiplier 215 and an adder 216 provide the value $$\left(\frac{be - cd}{ce - d^2}\right)^2 - 4\left(\frac{db - c^2}{ce - d^2}\right),$$

the root of which is provided by the root unit 217. The root unit 217 can be composed using a read-only-memory. The group of adders 218 and the group of multipliers 219 provide the value of $\alpha_0$ and $\alpha_1$. Using those values the adders 221 and 222, and the multiplier 220 provide the values $(-\alpha_0 - \alpha_1)$ and $(\alpha_0 \alpha_1)$. It should be appreciated that the plus code in the formula 21 relates to the value $\alpha_0$ and the minus code in the formula 21 relates to the value $\alpha_1$. The value $(-\alpha_0 - \alpha_1)$ is applied to the members 14 and 16, and the value $(\alpha_0 \alpha_1)$ is applied to the members 15 and 17 in FIG. 1.

Figure 5:
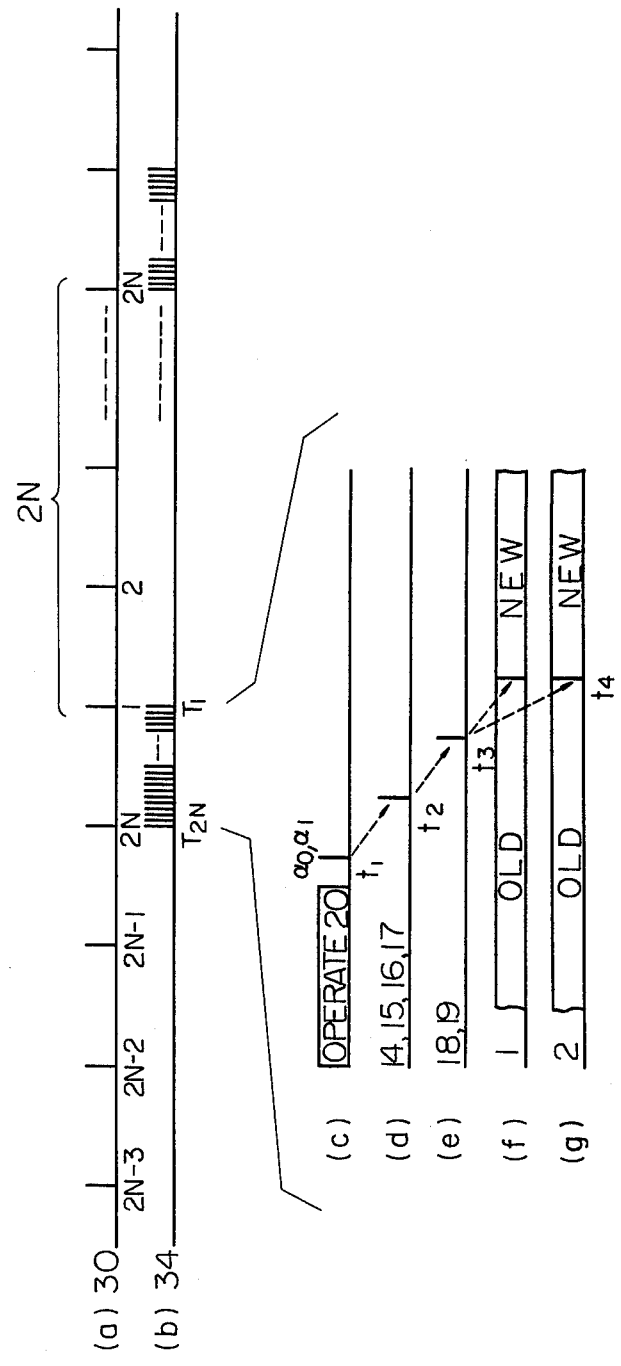
FIG. 5 is the operational time chart of the apparatus in FIG. 1.

FIG. 5 shows the operational time chart showing the operation of the apparatus of FIG. 1. The chart (a) shows the output pulses from the low speed clock pulse generator 30, the pulse speed of which corresponds to the transmission speed on a transmission line. When the transmission speed is 4800 baud and three bits are integrated in a single pulse, the pulse frequency in FIG. 5(a) is 1600(=4800/3) $H_z$. The chart (b) shows the output pulses from the gate circuit 34, which provides the high speed clock pulses from the high speed clock pulse generator 31 during $T_{2N}$ and $T_1$. The high speed clock pulses appear at the output of the gate circuit 34 after MN number of low speed pulses appear at the output of the generator 30. As M=2 in the present embodiment, the high speed pulses appear in every 2N low speed pulses, where N is the number of taps. The low speed clock pulses control the input signal applied to the input terminal 100. At time $T_{2N}$ when the first high speed pulse appears at the gate circuit 34, the $A^2C$ register 3 is filled with data, and the integrators 11, 12 and 13 provide the output $AC^J$, $A^2C^J$, and $A^3C^J$ respectively, and also the registers 201, 202 and 203 in FIG. 4 are filled with data. When the high speed clock pulse appears, the computer 20 first operates using the data stored in the registers 201, 202 and 203, and provides the output $\alpha_0$ and $\alpha_1$ at the time $t_1$ (see chart FIG. 5(c)). Using the output of the computer 20, the multipliers 14, 15, 16 and 17 provide the output signal at the time $t_2$ (see chart FIG. 5(d)). It should be noted that the outputs of the multipliers 15 and 16 are $-(\alpha_0 + \alpha_1) AC^J$, and $\alpha_0 \alpha_1 A^2C^J$, respectively, and those outputs correspond to the second and third terms in the right side in the formula 13. Using the outputs of the members 14, 15, 16 and 17, the adders 18 and 19 provide the outputs at the time $t_3$ (see chart FIG. 5(e)). And then, using the outputs of the adders 18 and 19, the C' register 1 and the AC register 2 are revised to the new data at time $t_4$ (see chart FIG. 5(f) and FIG. 5(g)). All steps, including the operation of the computer 20 and the revision of the registers 1 and 2, are performed during $T_{2N}$ and $T_1$ in FIG. 5(b). The above operation is repeated.

The output of the equalizer in FIG. 1 is obtained at the terminal 400. The present equalizer provides the same tap establishment as that of the prior art by the same number of input burst signals as the prior art and a plurality of pairs of tap adjustments.

Figure 6:
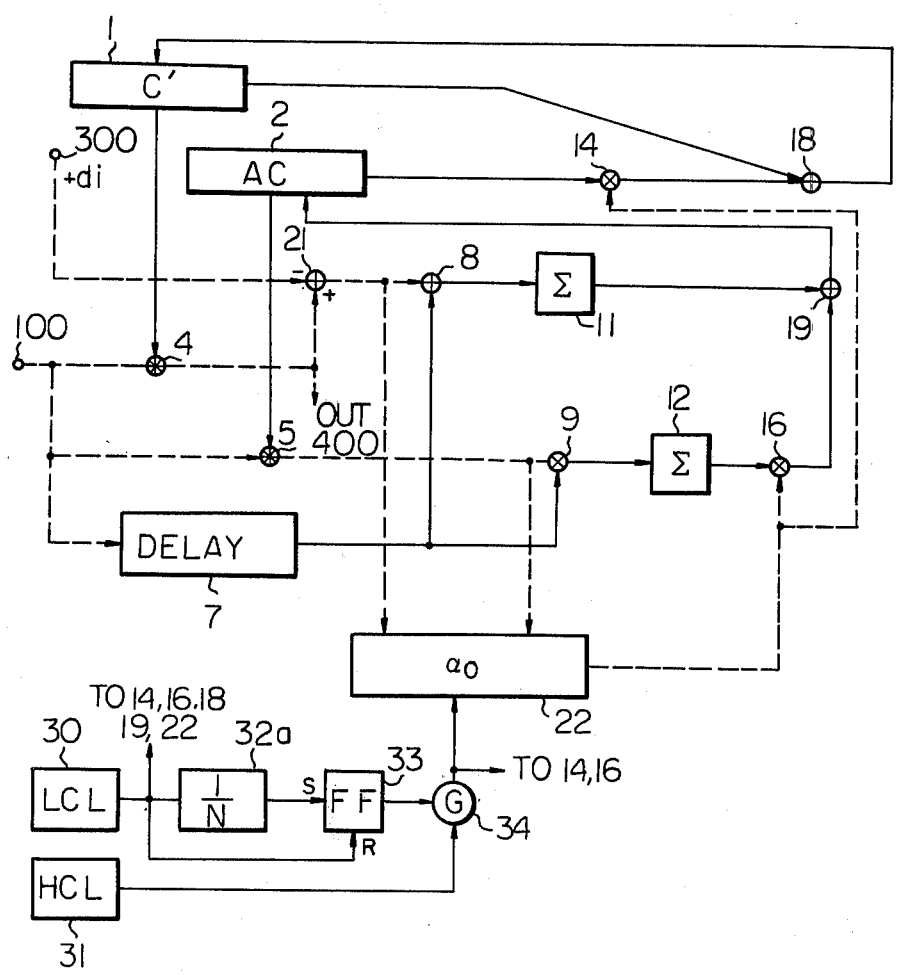
FIG. 6 is a block-diagram of the automatic equalizer for M=1 according to the present invention.

Next, the embodiment in the case of M=1 will be explained with reference to FIG. 6. In FIG. 6, the same reference numeral as in FIG. 1 indicates the same member as in FIG. 1. The reference numeral 22 is a $\alpha_0$ computer, and 32a is a 1/N divider. In the case of M=1, the C' register and the AC register are revised by a single input burst signal.

The input signal and the correct value $d_i$ are received from the terminals 100 and 300, respectively. The input signal passes the convolution units 4 and 5. The adder 21 provides the difference $X^T C^J$ between the output $X^T(C')^J$ of the convolution unit 4 and the correct value $d_i$. That difference $X^T C^J$ and the output $X^T AC^J$ of the convolution unit 6 are applied to the $\alpha_0$ computer 22, in which the value $\alpha_0$ is calculated by means of the equations (24) and (27). Using the calculated value $\alpha_0$, the C' register 1 is revised by means of the equation (22). That is to say, multiplier 14 provides the product of the AC register 2 and $(-\alpha_0)$, the adder 18 provides the sum of the output of the multiplier 14 and the output of the C' register 1, and the revised value $(C')^J$ is stored in the C' register 1. During the operation of the convolution units 4 and 5 for the input burst signal, the multipliers 8 and 9, and the integrators 11 and 12 operate, and the integrators 11 and 12 store $AC^J$ and $A^2C^J$, respectively. The multiplier 16, receiving the value $(-\alpha_0)$ from the $\alpha_0$ computer 22, provides the output $(-\alpha_0 A^2 C^J)$ and, thus, the adder 19 provides the output $$AC^J - \alpha_0 A^2 C^J$$

It should be noted that the above expression is the product of the revised value $C^{J+1}$ and A, A is multiplied from the left in view of the equation (22) and, thus, the AC register 2 is revised.

In FIG. 6, the 1/N divider 32a is provided instead of the ½N divider 32 in FIG. 1. Accordingly, the $\alpha_0$ computer 22 operates in every input burst signals.

Figure 7:
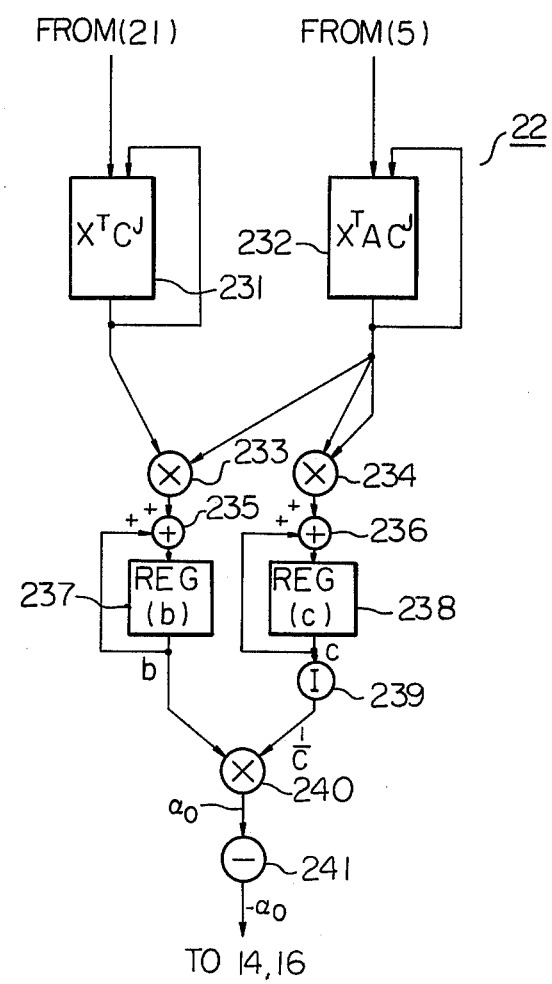
FIG. 7 is the detailed block-diagram of the computer 22 in FIG. 6.

FIG. 7 shows the detailed block-diagram of the $\alpha_0$ computer 22, which provides the value $\alpha_0 = b/c$ in the formula 27, where the values (b) and (c) are obtained through the formula 24. In FIG. 7, when a complete burst signal is applied to the input terminal 100, the registers 231 and 232 store the values of $X^T C^J$, and $X^T A C^J$ respectively. Next, when the high speed clock pulses are applied to the computer 22, the multipliers 233 and 234, the adders 235 and 236, and the registers 237 and 238 provide the values (b) and (c) in accordance with the formula 24. Next, the inverter 239 provides the value 1/c. Using the output (b) of the register 237 and the output (1/c) of the inverter 239 the multiplier 240 and the inverter 241 provide the values $\alpha_0$ and $-\alpha_0$ respectively in accordance with the formula 27. The value $-\alpha_0$ is applied to the multipliers 14 and 16, in FIG. 6.

In the case where the value of M is more than 2, for instance M=3, an additional register ($A^3C$ register) is introduced and three input burst signals are necessary.

Although the present invention is applicable to any value of M, the computer 20 or 22, or the calculation process must be improved in a case where M is large. For instance, when M is 2, the equation (20) is a simultaneous quadratic equation with two unknowns, but when M is m, the equation is a simultaneous m-order equation with m-unknowns. Therefore, when the value M is large, the calculation quantity is cumbersome, and so, improvement of the calculation process is necessary. The improvement is shown below.

From the equation (21), the values $$\frac{1}{\alpha_0} + \frac{1}{\alpha_2},$$

and $$\left| \frac{1}{\alpha_0} - \frac{1}{\alpha_1} \right|$$

are obtained as follows.

$$\frac{1}{\alpha_0} + \frac{1}{\alpha_1} = \frac{be - cd}{db - c^2} \tag{27a}$$

$$\left| \frac{1}{\alpha_0} - \frac{1}{\alpha_1} \right| = \sqrt{\left(\frac{be - cd}{db - c^2}\right)^2 - 4\left(\frac{ce - d^2}{db - c^2}\right)} \tag{28}$$

On the other hand, when the eigen (characteristic) value of A in the equation (8) is between $\lambda_u$ and $\lambda_l$, it is known that the best tap coefficient after the M tap adjustments is derived as follows.

$$\alpha_J = 2[(\lambda_u + \lambda_l) - (\lambda_u - \lambda_l)\cos(\frac{(2J + 1)\pi}{2M})]^{-1} \tag{29}$$

J=0, 1....., M−1, (T. J. Schonfeld, M. Schwartz, A Rapidly Converging First-Order Training Algorithm for an Adaptive Equalizer, IEEE Transactions on information theory, vol/IT-17, No. 4, July, 1971). Consequently, the value $\alpha_J$ when M is 2, can be derived from the equation (29).

$$\alpha_J = 2[(\lambda_u + \lambda_l) \pm (\lambda_u - \lambda_l)1/\sqrt{2}]^{-1} \tag{30}$$

$$\frac{1}{\alpha_0} + \frac{1}{\alpha_1}$$

and $$\left| \frac{1}{\alpha_0} - \frac{1}{\alpha_1} \right|$$

are as follows.

$$\frac{1}{\alpha_0} + \frac{1}{\alpha_1} = (\lambda_u + \lambda_l) \tag{31}$$

$$\left| \frac{1}{\alpha_0} - \frac{1}{\alpha_1} \right| = \frac{1}{\sqrt{2}} (\lambda_u - \lambda_l) \tag{32}$$

By combining the equations (27a) and (28), the following results are derived.

$$\lambda_u = \frac{1}{2}\left(\frac{be - cd}{db - c^2}\right) + \frac{1}{\sqrt{2}}\sqrt{\left(\frac{be - cd}{db - c^2}\right)^2 - 4\left(\frac{ce - d^2}{db - c^2}\right)} \tag{33}$$

$$\lambda_l = \frac{1}{2}\left(\frac{be - cd}{db - c^2}\right) - \frac{1}{\sqrt{2}}\sqrt{\left(\frac{be - cd}{db - c^2}\right)^2 - 4\left(\frac{ce - d^2}{db - c^2}\right)} \tag{34}$$

Accordingly, the process for obtaining the value $\alpha_J$ is:
(1) the values b, c, d, e, etc., are obtained from the time sequence of $X^T C^J, X^T A C^J, X^T A^2 C^J$, etc;
(2) $\lambda_u$ and $\lambda_l$ are obtained by means of the equations (33) and (34), and;
(3) $\alpha_J$ is obtained by means of the equation (29).

Computer simulation by the present inventors has shown that the above method is very useful.

Figure 8:
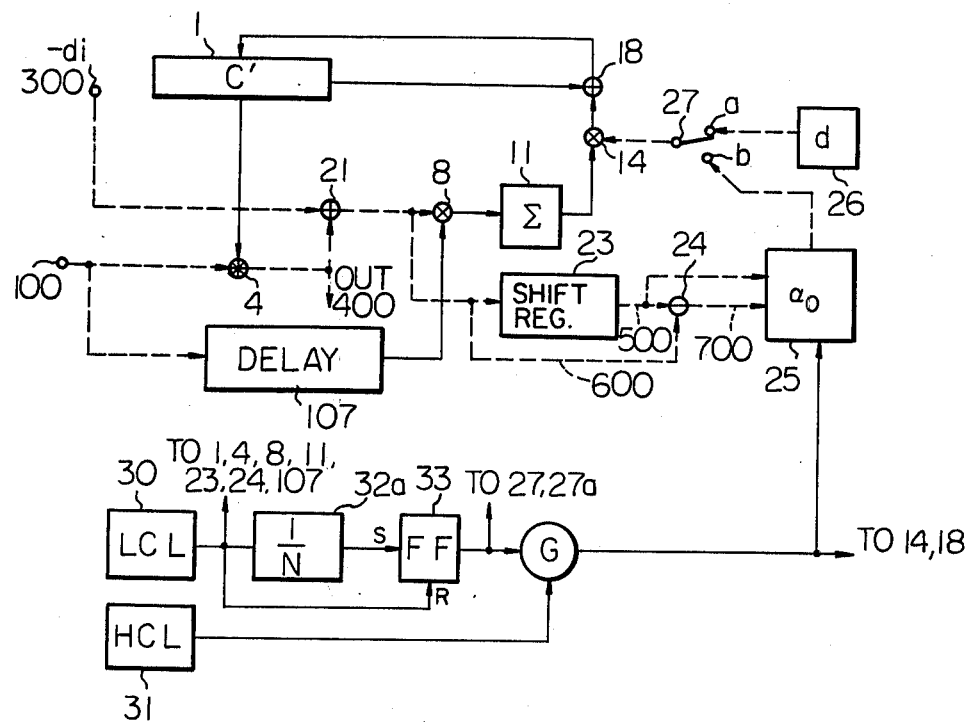
FIG. 8 is a block-diagram of the other embodiment of the automatic equalizer for M=1 according to the present invention.

FIG. 8 shows another embodiment with a simple structure for M=1. Although the apparatus of FIG. 1 is rather complicated even for M=1, the structure of FIG. 8 is more simple. The principle of FIG. 8 is that, using the fact that the tap coefficient does not change very much for each tap adjustment, the correct tap coefficient according to a prior art is first obtained and said correct tap coefficient is utilized for the equalization in the next operational cycle, instead of the equalization by the best tap coefficient in FIG. 1. In FIG. 8, the same reference numeral as in FIG. 1 indicates the same member as in FIG. 1. In FIG. 8, the reference numeral 23 is a shift register having a capacity equal to the input burst length, 24 is a subtractor, 25 is a tap coefficient computer, 26 is a tap coefficient generator and 27 is a switch. It should be noted that all portions except members 23, 24, 25 and 27 are the same structure as the prior art automatic equalizer.

It is assumed first that the switch 27 is connected to the (a) side so that the signal from side (a) is applied to the multiplier 14. In this configuration, the error voltage of the previous operational cycle appears at the conductors 500, the error voltage of the present operational cycle appears at the conductors 600, and the difference between the previous error and the present error appears at the conductors 700. Since the difference between errors is proportional to the output $\alpha$ of the generator 26, the ratio of said difference to $\alpha$ is $X^T A C^J$. Further, the portion 500 provides the error in the previous cycle, $XC^J$. The tap coefficient computer 25, using the signals at conductors 500 and 700, computes the correct tap coefficient at the time by means of the equations (24) and (27). In the next tap adjustment, the switch 27 is connected to the (b) side, and the tap adjustment is performed by using said tap coefficient obtained from the computer 25. As is apparent from the above explanation, a few attachments to a prior automatic equalizer are enough for configuring a simple equalizer for M=1 as shown in FIG. 5.

Figure 9:
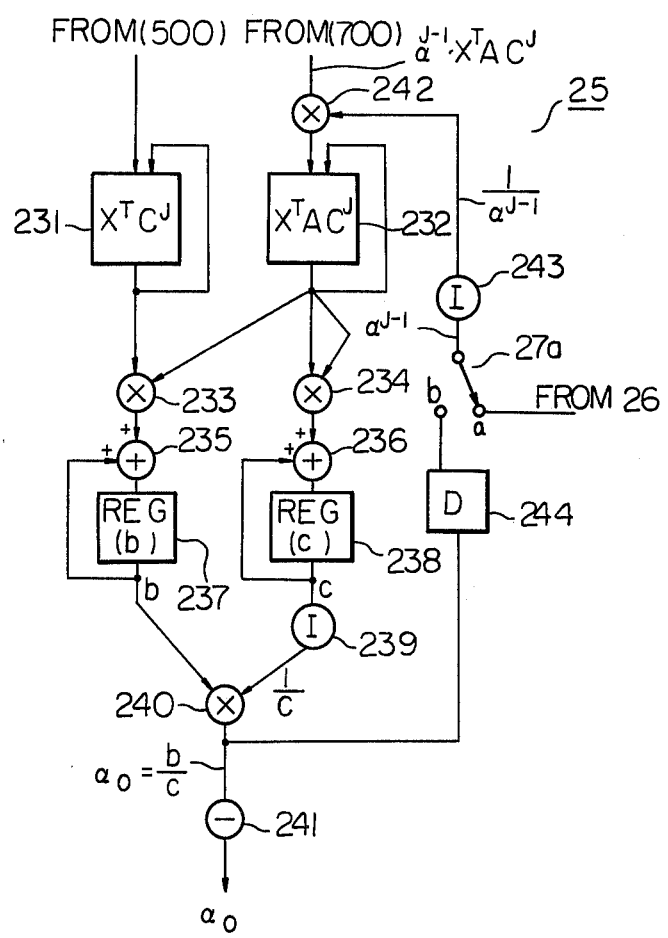
FIG. 9 is the detailed block-diagram of the computer 25 in FIG. 8.

FIG. 9 shows the detailed block-diagram of the computer 25 in FIG. 8. In FIG. 9, the same reference numerals as in FIG. 7 show the same members as those in FIG. 7, and the circuit of FIG. 9 provides the value $\alpha_0$ in accordance with the formula 27. In FIG. 9, the reference numeral 27a is a switch, 242 is a multiplier, 243 is an inverter, 244 is a delay circuit the delay time of which is the same as the burst signal time. At the initial condition before the first burst signal is applied to the input terminal 100, the switch 27a in FIG. 9 is connected to the contact (a), and thus the output of the tap coefficient generator 26 is applied to the register 232 through the switch 27a, inverter 243 and the multiplier 242, as the initial value of $\alpha_0$. Using this initial value, the circuit in FIG. 9 calculates the value of $\alpha_0$ of the next cycle. At the end of the first burst signal, that is to say, at the first high speed clock pulse, the switches 27 in FIG. 8 and 27a in FIG. 9 are changed to the contact (b) by the output of the flip-flop 33 in FIG. 8. Accordingly, the output $\alpha_0$ of the multiplier 240 is applied to the multiplier 242 through the delay circuit 244, the switch 27a, and the inverter 243. Thus, the value of $\alpha_0$ of the preceeding cycle is fed back to the input of the computer 25 for the calculation of the next cycle. It should be appreciated that the switch 27a is connected to the contact (a) only during the first burst signal, and after that the switch 27a is changed to the contact (b) for the remaining operations.

As explained in detail above, the best, or optimum adaptive tap establishment is performed for every M tap adjustment, and the most rapid convergence is obtained, according to the present invention. Further, for M=1, a simple structure of an equalizer is provided.

As explained above, a real number type equalizer for an AM (Amplitude Modulation) signal has been found. However, the present invention can be applicable to a complex number type equalizer for a QAM (Quadrature Amplitude Modulation) signal. In this case, all the signals and all the coefficients in the circuit must be complex numbers, and in the inner product operation as in the equation (18), one of the two vectors relating to the inner product operation must be replaced by its complex conjugate.

From the foregoing, it will now be apparent that a new and improved automatic equalizer has been found. It should be understood, of course, that the embodiments disclosed are merely illustrative and are not intended to limit the scope of the invention. Therefore, reference should be made to the appended claims, rather than the specification, as indicating the scope of the invention.

What is claimed is:

1. In a method for adjusting the tap coefficient of an adaptive automatic equalizer having a plurality of tapped registers comprising the steps of: applying an input signal repetitively to a train of tapped delay elements; obtaining a sum of the weighted output of each tap output; obtaining an error output by taking the difference between the sum of the weighted output of each tap output and a reference signal; and obtaining a correlation value between said error output and each tap output of said delay elements; the improvement comprising: storing the tap weights of each of said tapped registers; obtaining the total sum of each tap weight of one of said tapped registers wherein the weight of a tap is said correlation value; repeating M times, where M is an integer, the obtaining the total sum of each tap weight in another of said tapped registers; adding said error output to said total sum; determining the value of a tap coefficient by the final total sum after M adjustments for the most rapid equalization; obtaining the optimum coefficient using said value of said top coefficient for the most rapid equalization of said tapped registers; and revising the weight of the taps of said delay elements by the optimum coefficient-weight-sum of the contents of said tapped register and said tapped delay elements, thereby adjusting the weight of each tap of said delay elements.

2. The invention as defined in claim 1, wherein said value of M is 1.

3. The invention as defined in claim 1, wherein said value of M is 2.

4. An adaptive automatic equalizer comprising:
   (a) an input terminal, for receiving an input signal,
   (b) a plurality of registers,
   (c) a plurality of convolution units for calculating the convolution between the input signal and the content of one of said registers,
   (d) a train of delay elements having a plurality of taps at each delay interval T, which is equal to the pulse interval of the input signal,
   (e) an $\alpha$ computer means for computing the value ($\alpha$) of the tap adjustment coefficient from the output of the convolution units,
   (f) a plurality of multipliers for obtaining the product of the output of said delay elements and the output of said convolution units;
   (g) a plurality of integrators having the inputs thereof connected to the output of the multipliers,
   (h) changing means for changing the contents of each of said registers according to the output of said $\alpha$ computer means the outputs of said integrators and the precedent content of said registers,
   (i) a low speed clock pulse generator, the frequency of which is the same as the sampling frequency on a transmission line, for operating said registers, convolution units, a train of delay elements and said integrators,
   (j) a high speed clock pulse generator for operating said $\alpha$ computer means, said multipliers and changing means during a pair of low speed clock pulses in every MN low speed clock pulses, where M is an integer and N is a number of taps of said delay elements wherein said low speed clock pulse generator and said high speed clock pulse generator provide timing signals to said $\alpha$ computer means, and
   (k) an output terminal connected to the output of one of said convolution units for providing the output of said equalizer.

* * * * *